United States Patent Office 3,124,463
Patented Mar. 10, 1964

3,124,463
METHOD OF MAKING MARGARINE LESS SPATTERING
Gerardus Martinus Maria Houben, and Everhardus Wilhelmus Jonker, Gouda, Netherlands, assignors to N.V. Koninklijke Stearine Kaarsenfabrieken "Gouda-Apollo," Gouda, Netherlands, a corporation of the Netherlands
No Drawing. Filed Aug. 19, 1960, Ser. No. 50,559
Claims priority, application Netherlands Aug. 21, 1959
3 Claims. (Cl. 99—123)

The invention relates to a method preparing a margarine of improved properties, in particular as regards its behaviour in frying.

Margarine is known to spatter when fried. This is a source of inconvenience for users and many endeavours have been made to find substances which if present in margarine prevent spattering, or in other words which have an antispattering effect.

Of these antispattering additions lecithins or phosphatides in the form of egg yolk or of vegetable phosphatides from oil seeds, are the oldest; recently a synthetic lecithin has appeared. They decrease the tendency to spatter on frying but are far from preventing it; moreover, they have an undesirable effect on the taste and keeping qualities if used in proportion sufficient to obtain a worth-while reduction of spattering. Of chemical substances a great variety has been tested and though many substances cause a definite reduction in spattering only very few substances recommended for use as antispatterers suppress spattering to a desirable extent. Against the use of these few sufficiently effective substances serious objections have been raised in view of the health hazards they present. Accordingly it is quite common for margarines at present in the market to show marked and undesirable spattering on frying.

It is an object of the present invention to provide a combination of additives that causes margarines having a content of such a combination of substances to have a low spattering figure.

According to the invention a method of preparing margarine of a low spattering value comprises imparting a content of less than 0.08% of a phosphatide, preferably vegetable lecithin, and also an aliphatic partial ester product of a hydroxyl compound, selected from the group consisting of saturated fatty alcohols containing 8 to 16 carbon atoms, oleyl alcohol, ethers derived from the said alcohols and one molecule of a polyol and mono fatty acid esters of propylene glycol, on one hand, with a polycarboxylic acid selected from the group consisting of tricarballylic acid, aconitic acid, acylmalic acids, tartaric acid, diacyltartaric acids, citric acid and acylcitric acids, on the other hand, where the said aliphatic partial ester product contains a preponderant proportion of ester derived from one molecule of hydroxyli compound and one molecule of polycarboxylic acid.

The said esters of propylene glycol are derived from fatty acids containing 8 to 24 carbon atoms and may be saturated or unsaturated. The said acyl derivatives have an acyl radical containing 2 to 18 carbon atoms that may be saturated or unsaturated.

The word "product" refers to the circumstance that said aliphatic partial ester product need not be a pure chemical substance. The processes of preparing said aliphatic partial ester in general do not lead to one single ester in a pure state but rather to a mixture of several esters in which the number of the hydroxyl compound radicals and polycarboxylic acid radicals varies and, so far as the monoesters are concerned, where several structural formulae may apply. For instance, if one mol of lauryl alcohol is reacted with one mol of citric acid (compare Example I) until a substantially homogeneous liquid results, the esters which contain one lauryl alcohol radical esterified with one citric acid radical (of which two isomers obviously are possible) constitute the preponderant part of the reaction product, but the latter also contains dilaurylcitrates, trilaurylcitrate and unreacted citric acid. It has been found that the monoesters are the only partial esters that in combination with phosphatides have the antispattering effect of the invention, but it is not at all necessary to remove the dilauryl- and trilaurylesters, and the residual citric acid from the reaction product. The latter may be used in margarine as a whole, or by preference after decanting from the above mentioned lower layer which is highly acidic and non-effective.

A preferred embodiment of the invention is to use the said mixed aliphatic ester product that is derived from a fatty alcohol, by preference lauryl alcohol. The partial esters derived from lauryl alcohol are among the best of the said aliphatic partial esters when used according to the invention and they are easy to prepare by direct esterification. In preparing the ester from lauryl alcohol it is not necessary to use pure lauryl alcohol. Alcohol fractions consisting mainly of lauryl alcohol, or even the total range of alcohols obtained from the mixed fatty acids of coconut oil or palmkernel oil that contain roughly 48% lauryl alcohol are satisfactory for the purpose of the invention.

A further preferred embodiment of the invention is to use the aliphatic partial ester products that are derived from citric acid.

A still more preferred embodiment is to use the said aliphatic partial ester product that is derived from a fatty alcohol, by preference lauryl alcohol, and citric acid.

In preparing said partial ester product containing a preponderant proportion of ester derived from one molecule of hydroxyl compound and one molecule of polycarboxylic acid the reaction should be conducted in such a manner that the molecular proportion of the two components in the final stage of the reaction comes close to 1:1. In many cases, for instance when reacting the hydroxyl compound with an acylated hydroxypolycarboxylic acid anhydride, which are miscible, there is nothing against starting with an equimolecular mixture. But when the hydroxyl compound is reacted with a free polycarboxylic acid, a case that is of great importance from a production point of view, it is advisable to follow an unusual procedure, namely to start with a mixture containing an excess of the hydroxyl compound, say 2 mols, per 1 mol of polycarboxylic acid, and when esterification has proceeded sufficiently for a homogeneous or substantially homogeneous reaction mixture to be formed to add another 1 mol of polycarboxylic acid and to continue esterification until a substantially homogeneous reaction mixture has been obtained. As has been stated above a small lower layer of highly acid character, that is ineffective as an antispattering additive in margarine, may remain. Preferably this sticky byproduct is removed by cooling and settling, when it collects and solidifies and is easy to remove. The byproduct amounts to about 3% of the reaction mixture.

Accordingly, another preferred embodiment of the invention is a method of making margarine less spattering, comprising imparting a content of less than 0.08% of a phosphatide, preferably vegetable lecithin, and also a partial ester product obtained by a stepwise process comprising heating about 2 mols of the hydroxyl compound selected from the group consisting of saturated fatty alcohols containing 8 to 16 carbon atoms, oleyl alcohol, ethers derived from said alcohols and one molecule of a polyol, and mono fatty acid ethers of propylene glycol, preferably lauryl alcohol, with 1 mol citric acid to a temperature between 100–165° C. while stirring and removing reaction water until the reaction mixture has become substantially homogeneous, then adding citric acid until the final proportion of fatty alcohol and citric acid is about equimolecular, and continuing the reaction under the said conditions until the mixture has become substantially homogeneous.

As is well known in the esterification of components of a low volatility it is advantageous to carry out the reaction under reduced pressure and/or in a current of inert gas to remove the water of reaction in order to increase the reaction velocity and to complete the reaction.

Preference is given to the use of reduced pressure and/or a current of inert gas in the esterification of hydroxyl compounds and polycarboxylic acids.

Of course, other manners of preparing the aliphatic partial ester products may be applied for use according to the invention, including those which furnish a pure single mono ester. According to the invention, for making margarine less spattering, phosphatides and the aliphatic partial ester product may be added to the raw materials used for the preparation of margarine or to the margarine at any stage during its manufacture where good distribution can be obtained. The margarine may be prepared by any of the usual processes. The phosphatides may be of vegetable, animal or synthetic origin. They may be in a purified state but so-called lecithin, obtained from soyabean, groundnut, maize and rapeseed oil, as separated from the crude extracted oils and dried, meets the purpose. By preference soyalecithin containing about 60% phosphatides and for the rest mainly oil is used. The percentages of phosphatides added to margarine according to this specification refer to phosphatides of a phosphatide content of about 60%.

Some of the said aliphatic partial ester products in the presence of phosphatides show other desirable properties on frying apart from the antispattering effect, that is to say they cause the surface of the molten margarine to be in part covered by a stable foam; if the margarine contains ingredients that can form a brown sediment on frying several of the said partial ester products favour the formation of a finely divided loose sediment and prevent the separation of coarse dark particles or skins that tend to stick to the pan.

The proportion of aliphatic partial ester products added to margarine is usually below 0.3% since proportions of 0.3% and less together with less than 0.08% phosphatides are sufficient to prevent spattering satisfactorily. Apart from the cost there is no objection against using more than 0.3% of the aliphatic partial ester products.

Whereas the said partial ester products alone cause only a restricted decrease of the spattering of margarine the effect is extraordinary in the presence of unusually low percentages of phosphatides which alone are quite insufficient to reduce the spattering of margarine satisfactorily.

There is an optimal proportion between the percentage of phosphatides and of the said aliphatic partial ester products calculated on the margarine that is evidently dependent of the composition of the ester products. However, according to the invention the optimal proportion is not aimed at; the percentage of phosphatides is limited to less than 0.08% in view of the undesirable effect of phosphatides on the taste and keepability of margarine and notwithstanding the unusually low percentages of phosphatides used, the range from 0.02 to 0.06% being in general sufficient, margarines which spatter very little or not at all are obtained because of the extraordinary favourable influence of the mixed aliphatic ester products of the invention on the antispattering effect of phosphatides.

Other usual additives to margarine may also be added, for instance antiweeping agents like glycerol mono stearate. The antispattering effect in question consists therein that the additives cause the water of the margarine to boil off quietly on frying, without the small local explosions known as spattering that occur in margarines without antispattering additives. The spattering losses mentioned in this specification were determined by weighing a sheet of paper that is held in such a position as to catch all spatters leaving a pan in which 80 grams of the margarine to be tested is heated under standarized conditions over an open burner. Similar tests have been described. The effect of the additives was determined on a standard margarine to which no other antispattering additives than those to be tested had been added. The lecithin used was soyalecithin. The aliphatic partial ester products used with phosphatides according to the invention, or without were prepared in the manner indicated in the table:

TABLE

| No. of test | | Percentage added | | Spattering Loss, mg. |
|---|---|---|---|---|
| | | Ester prod. | Lecithin | |
| 1 | | 0 | 0.04 | 2,500 |
| 2 | | 0 | 0.12 | 475 |
| 3 | | 0 | 0.30 | 200 |
| | Ester products prepared from equimolecular quantities of: | | | |
| 4 | citric acid and propylene glycolmonostearate at 130° C. | 0.12 | 0 | 6,800 |
| 5 | ----do---- | 0.12 | 0.04 | 130 |
| 6 | ----do---- | 0.12 | 0.08 | 90 |
| 7 | ----do---- | 0.24 | 0.08 | 30 |
| 8 | acetylcitric and n-laurylalcohol at 110° C. | 0.12 | 0 | 3,100 |
| 9 | ----do---- | 0.12 | 0.04 | 350 |
| 10 | diacetyltartaric acid and n-laurylalcohol at 110° C. | 0.12 | 0 | 4,350 |
| 11 | ----do---- | 0.24 | 0 | 770 |
| 12 | ----do---- | 0.12 | 0.04 | 40 |
| 13 | citric acid and n-laurylalcohol (Example I). | 0.12 | 0 | 1,900 |
| 14 | ----do---- | 0.12 | 0.04 | 20 |
| | Esters products prepared in a different manner: | | | |
| 15 | purified mono n-laurylalcohol ester of citric acid.[1] | 0.12 | 0 | 1,850 |
| 16 | ----do---- | 0.12 | 0.04 | 10 |
| 17 | "di-n-laurylalcohol ester" of citric acid at 150° C.[2] | 0.12 | 0 | 4,100 |
| 18 | ----do---- | 0.12 | 0.04 | 1,800 |

[1] Prepared in analogy to the directions in USP 2,578,649, col. 5, line 55–col. 6, line 25.
[2] Prepared according to USP 2,485,634 Example 2 from 1 mol acid and 2 mols alcohol which yields a reaction product that according to column 9, lines 3 to 5, contains 10 to 15% monolauryl-, about 50% dilauryl- and for the rest trilauryl-citrates.

It will be evident that the combination according to the invention shows a synergistic effect as regards antispattering.

The esters mentioned in experiments Nos. 8 to 12 of the table are known from U.S.P. 2,236,516, Cahn and Harris, Examples A and B where mention is made of useful properties as an antispattering agent in margarine.

The experiments Nos. 8–12 show that quite an unsatisfactory antispattering effect is obtained with these esters alone, less even than with lecithin alone, and that these esters require the combination with phosphatides according to the present invention to reduce spattering to a satisfactory degree. The ester products of experiments Nos. 4–7 and 13–16 likewise show a meager antispattering effect for themselves but the effect becomes very good if a low percentage of lecithin is also present.

Similar results are obtained with an acylated monolauryl malate product, with the mono ester obtained from propylene glycol monostearate and acetylmalic acid anhydride, the monocitrate product of n-laurylalcohol monoglycerol ether and with corresponding monoester products derived from tricarballylic and aconitic acid.

Experiments Nos. 13–16 compared with Nos. 17–18 demonstrate that it is the mono- and not the diesters that in combination with phosphatides have a strong antispattering effect. This confirms that the feature of the invention, consisting in the use of an ester product containing a preponderant proportion of the esters derived from one molecule of hydroxyl compound and one molecule of polycarboxylic acid, is necessary to obtain a satisfactory antispattering effect without using impracticably high proportions of ester products.

In the examples spattering losses were determined as described above.

*Example I*

The mono n-lauryl citrate product of experiments Nos. 13–14 of the table was prepared by adding 1 mol citric acid to 2 mol n-laurylalcohol at 150° C. with stirring, heating 1.5 hrs. at 150° C. under reduced pressure, when the reaction mixture was substantially homogeneous. Subsequently another portion of 1 mol citric acid was added, and the mixture was stirred for another 3.5 hours at 150–160° C. under reduced pressure. A small lower layer remained undissolved and was semisolid at room temperature. From it the main ester product was decanted. In the frying test with 0.12% ester product and 0.04% lecithin in the margarine a fine non-sticking brown sediment was formed and the foam layer on the surface of the molten margarine was satisfactory.

*Example II*

To 121 g. palmitylalcohol (0.5 mol) kept at 150° C. with stirring, while nitrogen was bubbling through, were added 48 g. citric acid (0.25 mol) in the course of 25 minutes. After 2 hours at 150° C. the citric acid had nearly dissolved and after another 0.5 hour at 150° C. under a pressure of 110 mm. Hg the reaction liquid was substantially homogeneous. Subsequently another quantity of 48 g. citric acid was added in small portions in the course of 4 hours at a reaction temperature not exceeding 160° C., the pressure being reduced to 110 mm. Hg after each addition. Apart from a lower layer of 2 to 3 g. the product was homogeneous and solid at room temperature. Melting point 40–42° C. Spattering loss in margarine with 0.12% ester product—2000 mg. Spattering loss in margarine with 0.12% ester product+0.04 lecithin—20 mg. A mono oleyl citrate product was made in a completely parallel manner from 134 g. oleyl alcohol (0.5 mol) with two consecutive quantities, each of 0.25 mol, citric acid. After decanting from a small lower layer the main ester product was liquid at room temperature.

Spattering loss in margarine with 0.12% ester product—1500 mg. Spattering loss in margarine with 0.12% ester product+0.04% lecithin—30 mg.

*Example III*

50 g. of an ester product consisting preponderantly of mono n-lauryl malate, freed of non-reacted malic acid, obtained as described in Example I of the co-pending application Serial No. 50,565, filed on even date herewith, were reacted under anhydrous conditions with 30 g. acetic acid anhydride, and finally refluxed 2 hours. On distilling off the acetic acid formed and the excess of acetic acid anhydride under reduced pressure the monolauryl malate product was obtained with a hydroxyl value 12. Thus the product apart from a content of dilauryl acetyl malate still contained a low content of non-acetylated esters.

Spattering loss in margarine with 0.12% ester product—4600 mg. Spattering loss in margarine with 0.12% ester product+0.04% lecithin—60 mg.

*Example IV*

The glyceryl ether of n-lauryl alcohol $$C_{12}H_{23}O.CH_2CHOH.CH_2OH$$

was prepared from monochlorhydrin in analogy to the general method of preparing ethers from alkali metal alcoholates and halogeno compounds. The ether had M.P. 30° C., $n_D^{32}$ 1.4532. To 10 g. of the ether (0.038 mol) that was being stirred at 120° C., a current of nitrogen bubbling through 7.2 g. (0.038 mol) citric acid was added in 0.5 hour. After 0.75 hour's further heating at 120° C. under reduced pressure the mixture had become homogeneous. The ester product, consisting mainly of mono-glyceryl-n-lauryl-citrate, was solid at room temperature, M.P. 40–45° C. Spattering loss in margarine with 0.12% ester product+0.04% lecithin—10 mg.

After frying a finely divided brown sediment had been formed and a large part of the surface of the molten margarine was covered by a fine, stable foam layer.

*Example V*

8.8 g. tricarballylic acid (0.05 mol) was added to 18.6 g. n-lauryl alcohol (0.10 mol) being stirred at 150° C. and the mixture was further stirred 2 hours at 150° C. under reduced pressure, when the liquid had become homogeneous. Subsequently another portion of 8.8 g. tricarballylic acid was added and heating under reduced pressure was continued 3 hours at a temperature not exceeding 160° C. A small lower layer was separated by decanting. The product consisted preponderantly of mono-n-lauryl tricarballylate and was liquid at 30° C.

What we claim is:

1. A method of reducing the spattering properties of margarine which comprises adding to said margarine up to 0.3% by weight of a partial ester product obtained by heating about two mols of an alcohol selected from the group consisting of alkanols having 8 to 16 carbon atoms, oleyl alcohol, glycerol monoethers of alkanols having 8 to 16 carbon atoms and oleyl alcohol and mono-fatty acid esters of propylene glycol wherein the fatty acid has 8 to 24 carbon atoms with about one mol of citric acid at a temperature between 100 and 165° C. until a homogeneous mixture is obtained and then reacting another mol of citric acid with the homogeneous mixture and from 0.02% to less than 0.08% by weight of a phosphatide, the amount of said partial ester product being greater than the amount of said phosphatide.

2. A method of reducing the spattering properties of margarine which comprises adding to said margarine up to 0.3% by weight of a partial ester product obtained by heating about two mols of an alcohol selected from the group consisting of alkanols having 8 to 16 carbon atoms, oleyl alcohol, glycerol monoethers of alkanols having 8 to 16 carbon atoms and oleyl alcohol and mono-fatty acid esters of propylene glycol wherein the fatty acid has 8 to 24 carbon atoms with about one mol of tricarballylic acid at a temperature between 100 and 165° C. until a homogeneous mixture is obtained and then reacting another mol of tricarballylic acid with the homogeneous mixture and from 0.02% to less than 0.08% by weight of a phosphatide, the amount of said partial ester product being greater than the amount of said phosphatide.

3. A method of reducing the spattering properties of margarine which comprises adding to said margarine up to 0.3% by weight of a partial ester product obtained by heating about two mols of an alcohol selected from the group consisting of alkanols having 8 to 16 carbon atoms, oleyl alcohol, glycerol monoethers of alkanols having 8 to 16 carbon atoms and oleyl alcohol and mono-fatty acid esters of propylene glycol wherein the fatty acid has 8 to 24 carbon atoms with about one mol of tartaric acid at a temperature between 100 and 165° C. until a homogeneous mixture is obtained and then reacting another mol of tartaric acid with the homogeneous mixture and from 0.02% to less than 0.08% by weight of a phosphatide, the amount of said partial ester product being greater than the amount of said phosphatide.

References Cited in the file of this patent

UNITED STATES PATENTS

| 1,917,257 | Harris | July 11, 1933 |
| 2,089,470 | Epstein et al. | Aug. 10, 1937 |
| 2,485,634 | Vahlteich | Oct. 25, 1949 |
| 2,485,639 | Vahlteich | Oct. 25, 1949 |